(12) United States Patent
Tojo

(10) Patent No.: US 12,158,100 B2
(45) Date of Patent: Dec. 3, 2024

(54) VEHICLE

(71) Applicant: TOYOTA JIDOSHA KABUSHIKI KAISHA, Toyota (JP)

(72) Inventor: Isamu Tojo, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 83 days.

(21) Appl. No.: 18/303,278

(22) Filed: Apr. 19, 2023

(65) Prior Publication Data

US 2023/0410570 A1 Dec. 21, 2023

(30) Foreign Application Priority Data

Jun. 17, 2022 (JP) ................................. 2022-098003

(51) Int. Cl.
*F02B 37/18* (2006.01)
(52) U.S. Cl.
CPC ................................. *F02B 37/183* (2013.01)
(58) Field of Classification Search
CPC .............................................. F02B 37/18–186
See application file for complete search history.

(56) References Cited

U.S. PATENT DOCUMENTS

2016/0003175 A1 1/2016 Saito
2017/0122194 A1 5/2017 Nishio

FOREIGN PATENT DOCUMENTS

| DE | 102015111116 A1 * | 1/2016 | ............. F02B 37/18 |
|----|----|----|----|
| EP | 2905446 A1 * | 8/2015 | ............. F02B 37/16 |
| JP | 2007-56843 A | 3/2007 | |
| JP | 2009281227 A * | 12/2009 | |
| JP | 2012-136945 A | 7/2012 | |
| JP | 2015-178810 A | 10/2015 | |
| JP | 2016-17426 A | 2/2016 | |
| WO | WO-2013157126 A1 * | 10/2013 | ............. F02B 37/12 |

* cited by examiner

*Primary Examiner* — Ngoc T Nguyen
(74) *Attorney, Agent, or Firm* — Oblon, McClelland, Maier & Neustadt, L.L.P.

(57) ABSTRACT

A vehicle includes an engine, a turbocharger that supercharges intake air to the engine, an exhaust passage connected to the engine, a turbine of the turbocharger being disposed in the exhaust passage, a bypass passage that bypasses the turbine and is connected to the exhaust passage, a waste gate valve that opens and closes the bypass passage; and an abnormality determination device configured to include a determination unit configured to determine an abnormality of the waste gate valve when an operation state of the engine is a supercharging state.

8 Claims, 6 Drawing Sheets

VEHICLE

CROSS-REFERENCE TO RELATED APPLICATION

This application is based upon and claims the benefit of priority of the prior Japanese Patent Application No. 2022-098003, filed on Jun. 17, 2022, the entire contents of which are incorporated herein by reference.

FIELD OF THE INVENTION

The present disclosure relates to a vehicle.

BACKGROUND

There is known a technique for determining an abnormality of a waste gate valve when an operation state of an engine is a low-speed and low-load state (see, for example, Japanese Unexamined Patent Application Publication No. 2007-056843).

Depending on driving characteristics of a driver and a vehicle type, a period in which the operation state of the engine is maintained at a low speed and low load state is short or the frequency thereof is reduced, and thus the frequency of the abnormality determination of the waste gate valve might be reduced.

SUMMARY OF THE INVENTION

It is therefore an object of the present disclosure to provide a vehicle in which a frequency of abnormality determination of a waste gate valve is ensured.

The above object is achieved by a vehicle including: an engine; a turbocharger that supercharges intake air to the engine; an exhaust passage connected to the engine, a turbine of the turbocharger being disposed in the exhaust passage; a bypass passage that bypasses the turbine and is connected to the exhaust passage; a waste gate valve that opens and closes the bypass passage; and an abnormality determination device configured to include a determination unit configured to determine an abnormality of the waste gate valve when an operation state of the engine is a supercharging state.

The abnormality determination device may include an obtainment unit configured to obtain a supercharging pressure and an intake air amount of the engine, and the determination unit may be configured to determine the abnormality of the waste gate valve on a basis of the supercharging pressure and the intake air amount in the supercharging state.

The determination unit may be configured to determine the abnormality of the waste gate valve on a basis of the supercharging pressure and the intake air amount in the supercharging state and the supercharging pressure and the intake air amount in an idling state of the operation state.

The determination unit may be configured to determine that the waste gate valve is normal when a determination value obtained by dividing a difference in the supercharging pressure between the idling state and the supercharging state by a difference in the intake air amount between the idling state and the supercharging state is less than a threshold, and is configured to determine that the waste gate valve is abnormal when the determination value is equal to or greater than the threshold.

The determination unit may be configured to determine the abnormality of the waste gate valve on a basis of the supercharging pressure and the intake air amount in the idling state and the supercharging pressure and the intake air amount in a naturally aspirated state in which the operation state is other than the idling state.

The supercharging state may be a full load state in which an accelerator opening degree is maximum.

DETAILED DESCRIPTION

[Schematic Configuration of Vehicle]

Figure 1:
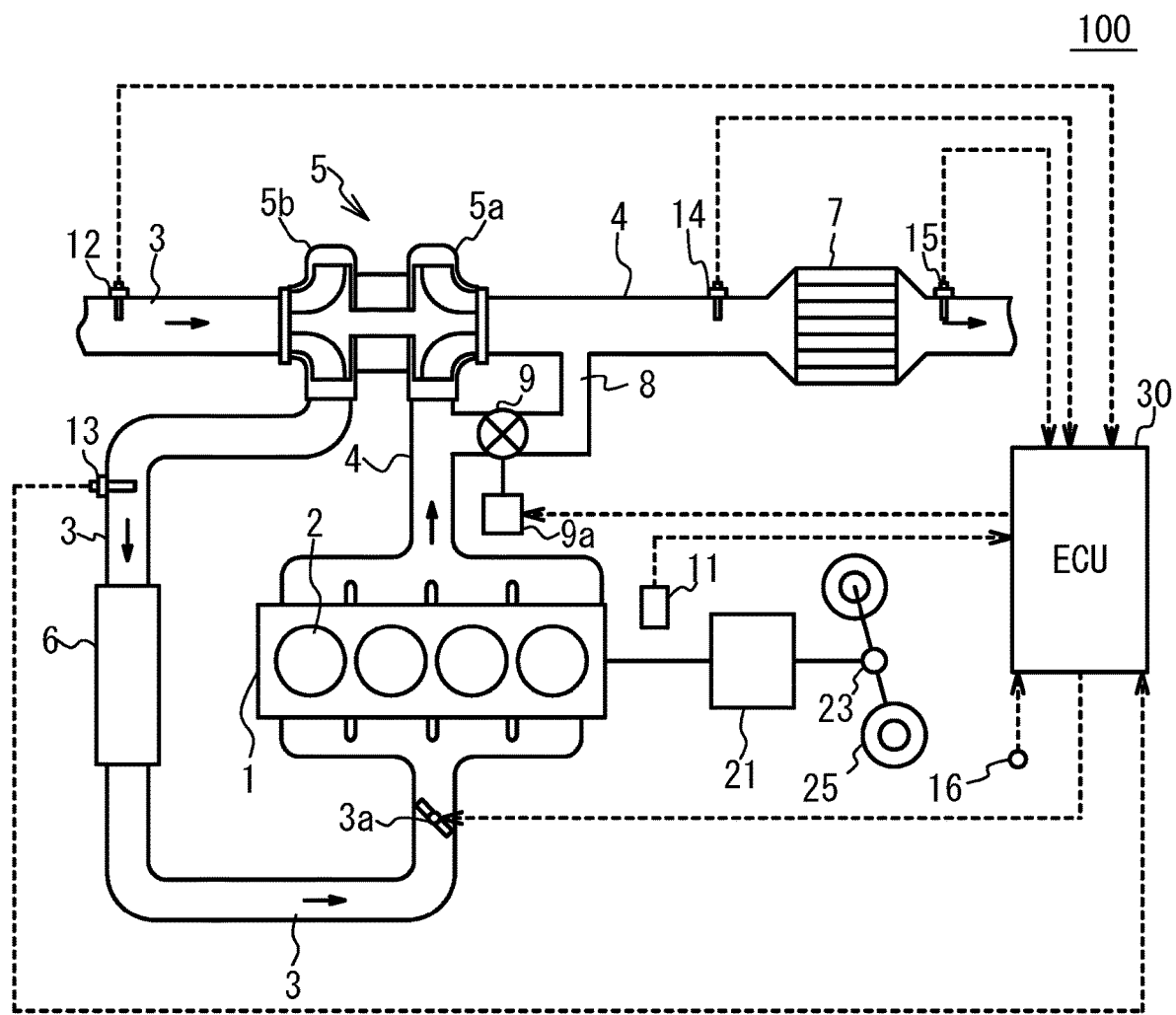
FIG. 1 is a schematic configuration view of a vehicle.

FIG. 1 is a schematic configuration view of a vehicle 100. The vehicle 100 is equipped with an engine 1, an intake passage 3, an exhaust passage 4, a turbocharger 5, an inter cooler 6, a catalyst 7, a bypass passage 8, a waste gate valve 9, a transmission 21, a differential 23, wheels 25, an electronic control unit (ECU) 30, and the like. The engine 1 is a multi-cylinder engine having four cylinders 2 arranged in series, and is a gasoline engine. However, the number of cylinders is not limited to this, and the engine may be a diesel type. Drive force of the engine 1 is transmitted to the wheels 25 via the transmission 21 and the differential 23.

The intake passage 3 and the exhaust passage 4 are connected to the engine 1. A compressor 5b of the turbocharger 5 is disposed in the intake passage 3. A turbine 5a of the turbocharger 5 is disposed in the exhaust passage 4. The turbine 5a and the compressor 5b are coaxially connected through a shaft. The turbocharger 5 supercharges intake air flowed to the engine 1.

The exhaust passage 4 is provided with the bypass passage 8 bypassing the turbine 5a, and the waste gate valve 9 for opening and closing the bypass passage 8. The waste gate valve 9 is connected to a diaphragm type negative pressure actuator 9a, and the ECU 30 controls an opening degree of the waste gate valve 9 by controlling the negative pressure actuator 9a. A distribution ratio between a flow rate of the exhaust gas flowing through the bypass passage 8 and a flow rate of the exhaust gas flowing through the turbine 5a is adjusted by adjusting the opening degree of the waste gate valve 9. This adjusts the rotational driving force of the turbine 5a, and the amount of air compressed by the compressor 5b, which adjusts the supercharging pressure of the engine 1. Herein, regarding the distribution ratio, specifically, the flow rate of the exhaust gas flowing through the bypass passage 8 decreases and the flow rate of the exhaust gas flowing through the turbine 5a increases, as the opening degree of the waste gate valve 9 decreases. When the waste gate valve 9 is fully opened, the engine 1 operates in the same manner as a naturally aspirated engine without the supercharger 5. Instead of the negative pressure actuator 9a, an electric actuator that electrically operates the waste gate valve 9 may be used.

The inter cooler 6 is disposed downstream of the compressor 5b in the intake passage 3. A coolant supplied to the engine 1 flows through the intercooler 6. This causes the heat exchange between the coolant flowing through the intercooler 6 and the air flowing through the intercooler 6, which cools the intake air. A throttle valve 3a is disposed downstream of the inter cooler 6 in the intake passage 3. The intake air amount of the engine 1 is adjusted by adjusting the opening degree of the throttle valve 3a.

The opening degree of the throttle valve 3a is controlled by the ECU 30 based on the accelerator opening degree.

The catalyst 7 for purifying the exhaust gas is provided downstream of the turbine 5a in the exhaust passage 4. An air-fuel ratio sensor 14 is provided on the upstream side of the catalyst 7 in the exhaust passage 4. An oxygen sensor 15 for detecting a concentration of oxygen in the exhaust gas is provided downstream of the catalyst 7 in the exhaust passage 4.

The ECU 30 includes a central processing unit (CPU), a read only memory (ROM), and a random access memory (RAM). The ECU 30 executes abnormality determination control described later based on information from the sensors, information stored beforehand in the ROM, and the like, in accordance with a control program stored beforehand in the ROM. The ECU 30 is an example of an abnormality determination device. The abnormality determination control is executed by a determination unit and an obtainment unit that are functionally achieved by the CPU, the ROM, and the RAM. Details will be described later.

The ECU 30 controls the operation state of the engine 1 based on detection signals from various sensors such as a crank angle sensor 11, an air flow meter 12, a supercharging pressure sensor 13, the air-fuel ratio sensor 14, the oxygen sensor 15, and an accelerator opening sensor 16. The crank angle sensor 11 detects a rotation angle of a crankshaft of the engine 1. The air flow meter 12 detects the amount of intake air taken into the intake passage 3. The supercharging pressure sensor 13 detects pressures in the intake passage 3 downstream of the compressor 5b and upstream of the throttle valve 3a. The air-fuel ratio sensor 14 detects the air-fuel ratio of the exhaust gas flowing into the catalyst 7. The oxygen sensor 15 detects the concentration of oxygen in the exhaust gas discharged from the catalyst 7. The accelerator opening sensor 16 detects an opening of an accelerator pedal operated by a driver.

The ECU 30 outputs an instruction negative pressure value to the negative pressure actuator 9a such that the waste gate valve 9 is opened in accordance with the operation state of the engine 1. The instruction negative pressure value means an instruction value of the negative pressure in a negative pressure chamber of the negative pressure actuator 9a of the diaphragm type. The instruction negative pressure value in the present embodiment is an absolute value of pressure with respect to the atmospheric pressure, and is represented as a positive value. Here, the opening degree of the waste gate valve 9 decreases as the pressure in the negative pressure chamber decreases from the atmospheric pressure, and the opening degree of the waste gate valve 9 increases as the pressure in the negative pressure chamber increases to the atmospheric pressure. That is, the instruction negative pressure value is adjusted to a smaller value as a required opening degree of the waste gate valve 9 is larger, and the instruction negative pressure value is adjusted to a greater value as the required opening degree of the waste gate valve 9 is smaller. For example, when the required opening degree of the waste gate valve 9 is maximum, the instruction negative pressure value is controlled to be less than the pressure value n1 as described later. When the operation state of the engine 1 is the idling state or a naturally aspirated state, the required opening degree to the waste gate valve 9 is maximum. When the operation state of the engine 1 is the supercharging state, the required opening degree to the waste gate valve 9 is other than maximum.

As described above, when the waste gate valve 9 is in a normal state, the opening of the waste gate valve 9 is controlled in accordance with the instruction negative pressure value output from the ECU 30 to the negative pressure actuator 9a, which controls the supercharging pressure. However, an abnormal state in which the waste gate valve 9 is stuck in the fully closed state (hereinafter referred to as stuck closed state) might occur. In this case, since the opening degree of the waste gate valve 9 is maintained in the fully closed state regardless of the instruction negative pressure value to the negative pressure actuator 9a, drivability might be influenced. Therefore, the ECU30 executes abnormality determination control for determining such a stuck closed state of the waste gate valve 9.

[Abnormality Determination Control]

Figure 2:
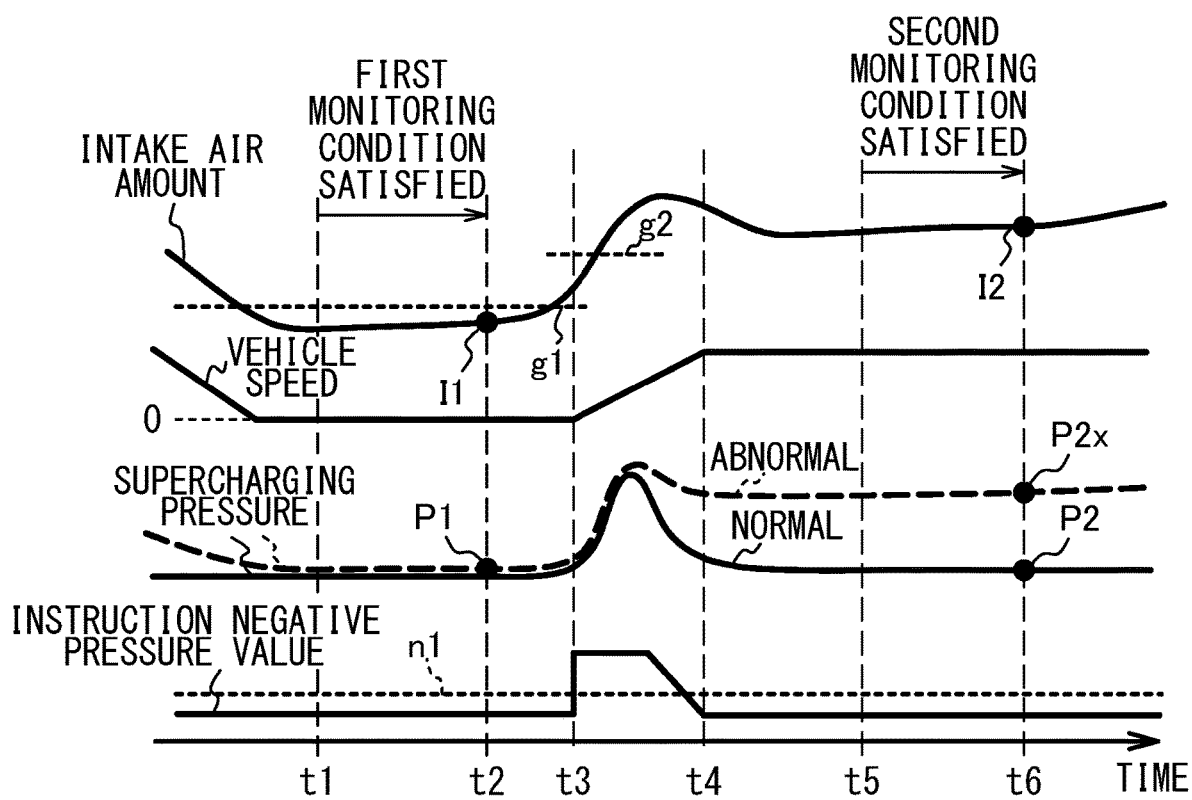
FIG. 2 is a timing chart illustrating an example of abnormality determination control in a case where the vehicle starts to travel at low speed from a temporary stopped state.

FIG. 2 is a timing chart illustrating an example of the abnormality determination control when the vehicle 100 starts to travel at a low speed from the temporary stopped state. FIG. 2 illustrates changes in the intake air amount, the vehicle speed, the supercharging pressure, and the instruction negative pressure value. When the first monitoring condition is satisfied during the temporal stop of the vehicle 100 (time t1), the ECU30 obtains the intake air amount I1 and the supercharging pressure P1 (time t2). The first monitoring condition is a case where the intake air amount is less than an air amount g1 and the instruction negative pressure value is less than a negative pressure value n1. An instruction negative pressure value less than the pressure value n1 indicates that the required opening degree of the waste gate valve 9 is maximum. In other words, the first monitoring condition indicates that the operation state of the engine 1 is the idling state.

Next, the driver operates the accelerator opening to be relatively small, and the instruction negative pressure value to the negative pressure actuator 9a temporarily increases, and the required opening to the waste gate valve 9 decreases. As a result, the intake air amount and the supercharging pressure increase, and the vehicle 100 accelerates (time t3). After that, the instruction negative pressure value decreases again to less than the pressure value n1, and the required opening degree of the waste gate valve 9 is maximum. Thus, the vehicle speed is maintained at a low speed (time t4), so the intake air amount and the supercharging pressure are stabilized.

Next, when the second monitoring condition is satisfied (time t5), the ECU 30 obtains the intake air amount I2 and the supercharging pressure P2 (time t6). The second monitoring condition is a condition (a) in which the intake air amount is larger than an air amount g2 and the instruction negative pressure value is smaller than the negative pressure value n1. Also in this case, the instruction negative pressure value less than the value n1 indicates that the requested opening degree of the waste gate valve 9 is maximum. In other words, the condition (a) indicates that the operation state of the engine 1 is the naturally aspirated state other than the idling state.

Here, in the normal state of the waste gate valve 9, the required opening degree to the waste gate valve 9 temporarily becomes zero at the time of acceleration and then becomes maximum again after the vehicle speed becomes constant, and the supercharging pressure decreases. Therefore, the supercharging pressure P2 is substantially the same as the supercharging pressure P1. However, when the waste gate valve 9 is stuck closed, the exhaust gas discharged from the engine 1 passes through the turbine 5a without passing through the bypass passage 8, and the supercharging pressure does not decrease and maintains high even after the vehicle speed becomes constant. Therefore, as illustrated in FIG. 2, the supercharging pressure P2x in the abnormal state at time t6 is higher than the supercharging pressure P2 in the normal state.

The ECU 30 performs abnormality determination as follows. A difference between the supercharging pressures obtained in satisfying the first and second monitoring conditions is divided by a difference between the intake air amounts obtained in satisfying the first and second monitoring conditions. This divided value is referred to as a determination value. Therefore, in the normal state of the waste gate valve 9 illustrated in FIG. 2, the determination value=(P2−P1)/(I2−I1) is satisfied. In the abnormal state of the waste gate valve 9 illustrated in FIG. 2, the determination value=(P2x−P1)/(I2−I1) is satisfied.

Figure 3:
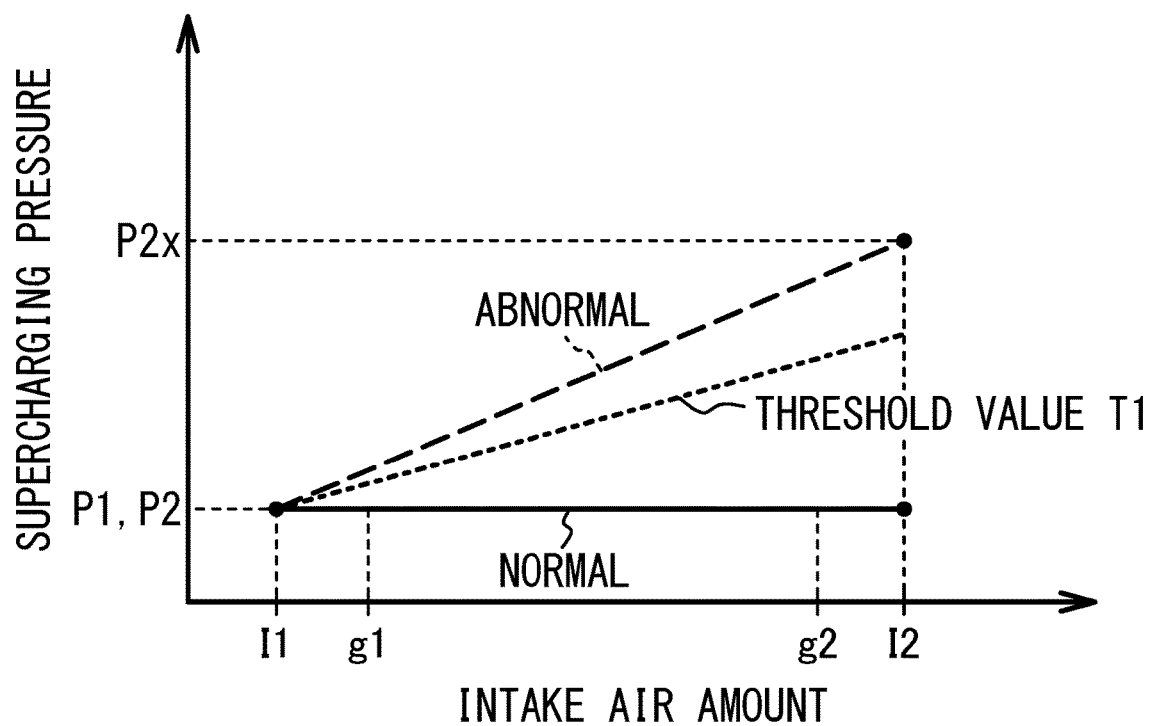
FIG. 3 is a graph illustrating a relationship between a supercharging pressure and an intake air amount.

FIG. 3 is a graph illustrating a relationship between the supercharging pressure and the intake air amount. A vertical axis represents the supercharging pressure, and a horizontal axis represents the intake air amount. The determination value corresponds to an inclination of a line segment in the graph of FIG. 3. When the determination value is less than a threshold valueT1, the normal state is determined. When the determination value is equal to or greater than the threshold valueT1, the abnormal state is determined.

In this way, the above-described abnormality determination control is executed when the vehicle 100 starts to travel at low speed from the temporary stopped state. However, for example, in a case where the vehicle 100 is a sports car and the driver frequently steps on the accelerator greatly, the frequency of low-speed traveling as described above might decrease, so that the execution frequency of the abnormality determination control might decrease. Therefore, the ECU 30 in the present embodiment executes the abnormality determination control, even when the vehicle 100 starts to travel at high speed from the temporary stopped state, as described below.

Figure 4:
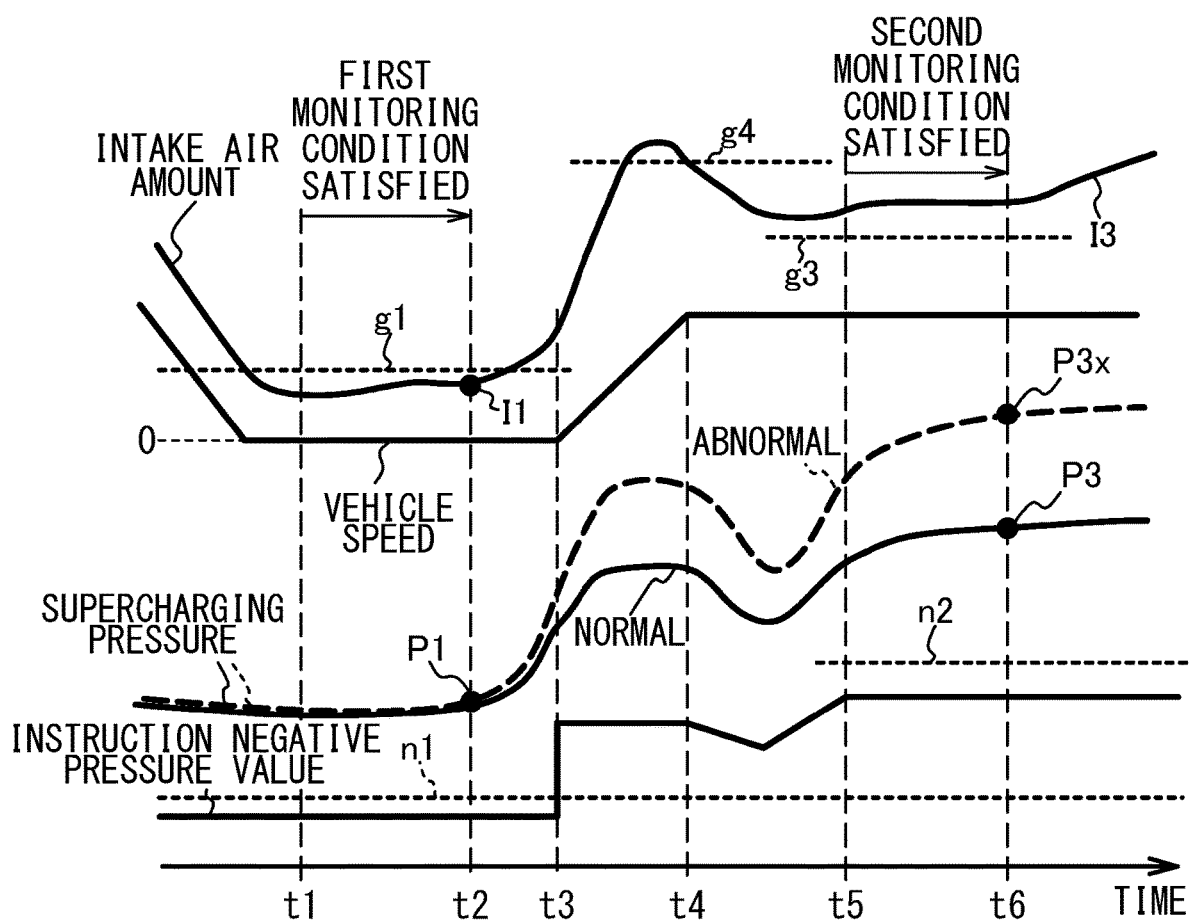
FIG. 4 is a timing chart illustrating an example of the abnormality determination control in a case where the vehicle starts to travel at high speed from the temporary stopped state.

FIG. 4 is a timing chart illustrating an example of the abnormality determination control in a case where the vehicle 100 starts to travel at high speed from the temporary stopped state. FIG. 4 corresponds to FIG. 2. The first monitoring condition is satisfied (time t1), and the ECU 30 obtains the intake air amount I1 and the supercharging pressure P1 (time t2). Next, the accelerator is operated by the driver so as to be fully opened, the intake air amount and the supercharging pressure increase, so the vehicle 100 accelerates (time t3). Thereafter, the vehicle is maintained at high speed (time t4), and the instruction negative pressure value is controlled to a value greater than the value n1 so as to stabilize the intake air amount and the supercharging pressure.

Thereafter, when the second monitoring condition is satisfied (time t5), the ECU 30 obtains the intake air amount I3 and the supercharging pressure P3 (time t6). The second monitoring condition is a condition (b) in which the intake air amount and the turbocharging pressure are stable, the intake air amount is larger than the air amount g3 and smaller than the air amount g4, and the instruction negative pressure value is smaller than the pressure value n2. The instruction negative pressure value less than the value n2 indicate a case where the required opening degree of the waste gate valve 9 is other than zero. In other words, the condition (b) indicates that the operation state of the engine 1 is the supercharging state. The supercharging state required in the condition (b) is a full load state in which the accelerator opening is maximum and the required opening degree of the throttle valve 3a is maximum. Therefore, when either one of the above conditions (a) and (b) is satisfied, it is considered that the second monitoring condition is satisfied. Regarding the intake air amount, g2<g3<g4 is satisfied. Regarding the instruction negative pressure value, air pressure=0<n1<n2 is satisfied.

Here, when the waste gate valve 9 is normal, the required opening degree to the waste gate valve 9 is maintained such that the waste gate valve 9 is half opened at the time of acceleration, then the supercharging pressure increases and is maintained at a predetermined value. However, when the waste gate valve 9 is stuck closed, all the exhaust gas from the engine 1 passes through the turbine 5a, then the supercharging pressure greatly increases. Therefore, as illustrated in FIG. 4, a supercharging pressure P3x in the abnormal state at time t6 is higher than a supercharging pressure P3 in the normal state. Therefore, in the normal state of the waste gate valve 9 illustrated in FIG. 4, the determination value=(P3−P1)/(I3−I1) is satisfied. In the abnormal state of the waste gate valve 9 illustrated in FIG. 4, the determination value=(P3x−P1)/(I3−I1) is satisfied.

Figure 5:
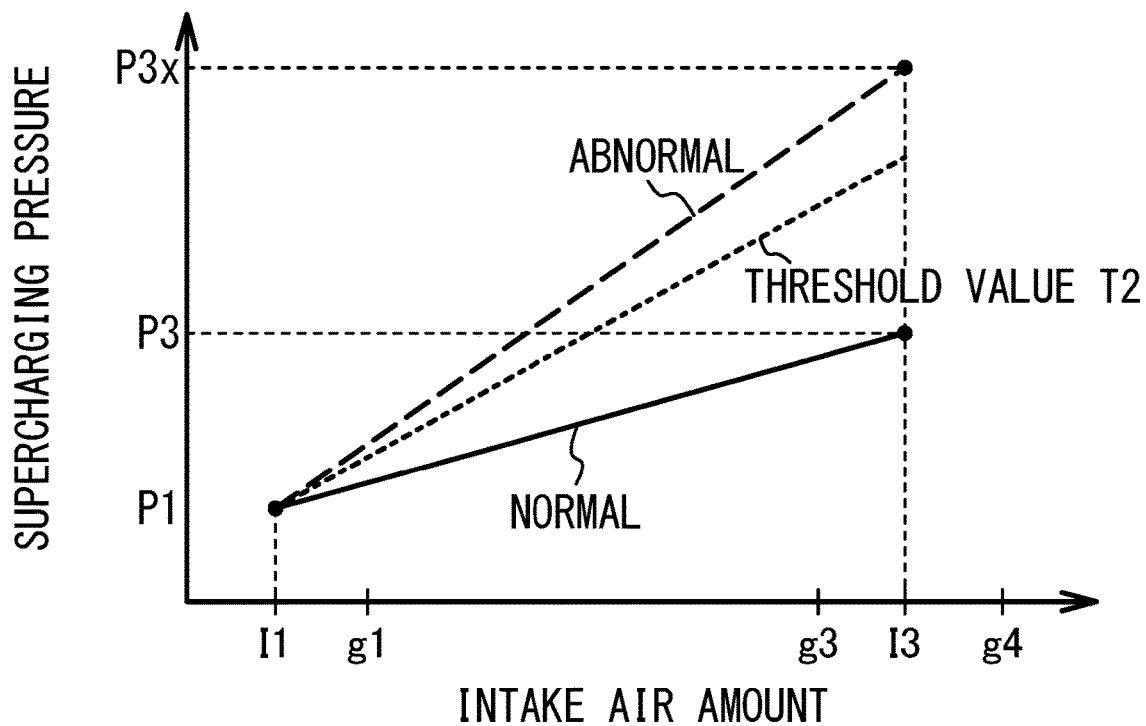
FIG. 5 is a graph illustrating a relationship between the supercharging pressure and the intake air amount.

FIG. 5 is a graph illustrating the relationship between the supercharging pressure and the intake air amount. FIG. 5 corresponds to FIG. 3. When the determination value is less than a threshold valueT2, the normal state is determined. When the determination value is equal to or greater than the threshold valueT2, the abnormal state is determined. The threshold valueT2 is greater than the threshold valueT1 illustrated in FIG. 3.

Since the condition (b) is included in the second monitoring condition in this way, it is possible to ensure the frequency of execution of the abnormality determination control, even when the frequency of low-speed travelling is low.

For example, when the second monitoring condition includes only the condition (a), it is conceivable to limit the transition to the supercharging state until the normal state of the waste gate valve 9 is determined in consideration of safety. In this case, the drivability deteriorates until the second monitoring condition is satisfied. Since the condition (b) is included in the second monitoring condition as described above, it is possible to execute the abnormality determination even in the supercharging state. Therefore, the above-described limitation is not needed, and it is possible to suppress the deterioration of the drivability.

As described above, in the condition (b), the intake air amount is limited to be larger than the air amount g3 and less than the air amount g4. This range of the intake air amount is set to a range in which the difference between the supercharging pressure in the normal state and the supercharging pressure in the fully closed and stuck state is large. That is, when the intake air amount belongs to this range, the difference between the supercharging pressure in the normal state and the supercharging pressure in the stuck closed state is large. Therefore, it is possible to accurately executes the abnormality determination.

Figure 6:
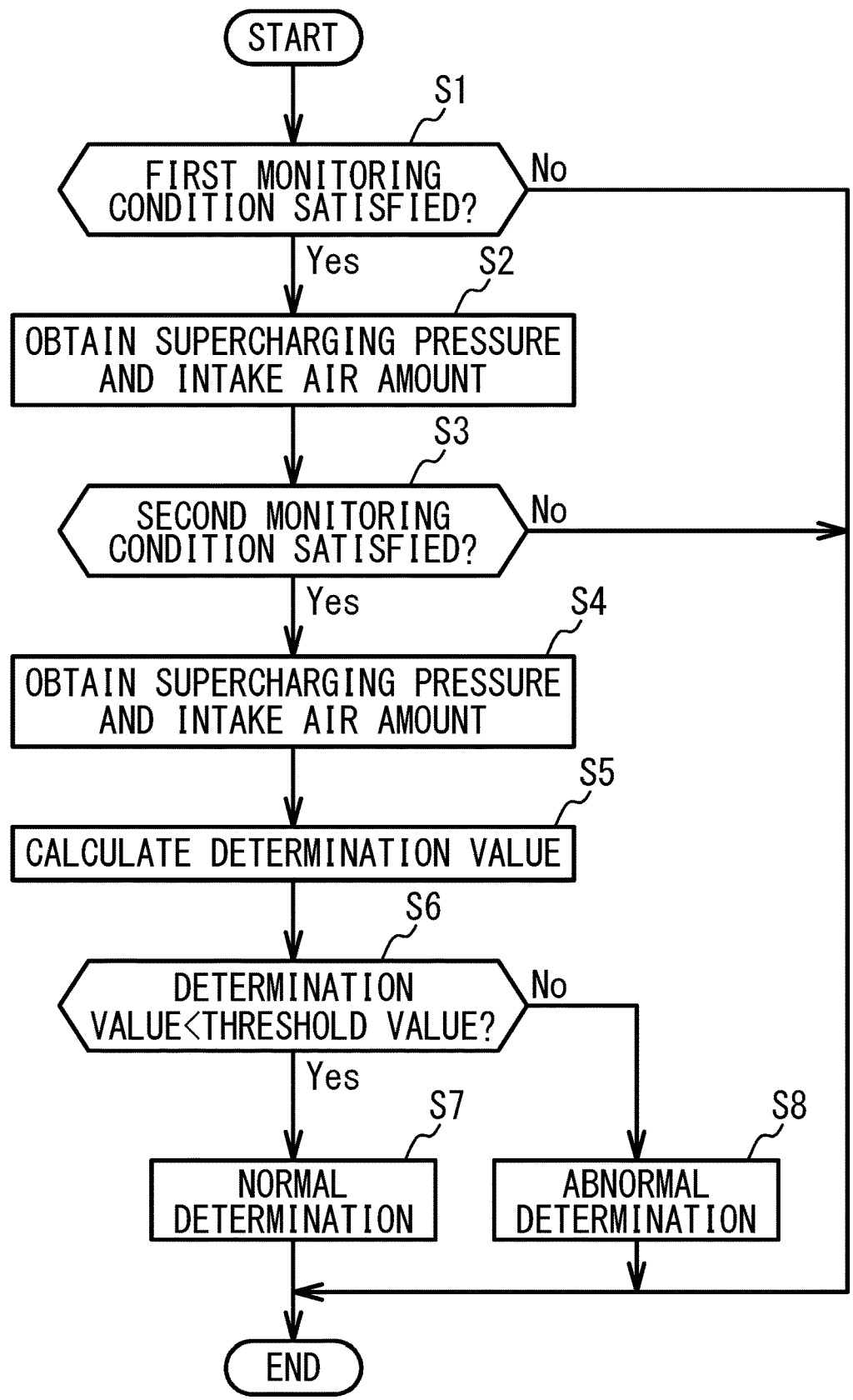
FIG. 6 is a flowchart illustrating an example of the abnormality determination control executed by an ECU.

FIG. 6 is a flowchart illustrating an example of the abnormality determination control executed by the ECU 30. The ECU 30 determines whether or not the first monitoring condition is satisfied (step S1). In the case of No in step S1, this control is ended. In the case of Yes in step S1, the ECU 30 obtains the supercharging pressure and the intake air amount based on detection values of the supercharging pressure sensor 13 and the air flow meter 12 (step S2). Step S2 is an example of a process executed by the obtainment unit.

Next, the ECU 30 determines whether or not the second monitoring condition is satisfied (step S3). The second monitoring condition is considered to be satisfied when either one of the conditions (a) and (b) is satisfied as described above. In the case of No in step S3, this control is ended. In the case of Yes in step S3, the ECU 30 obtains the supercharging pressure and the intake air amount (step S4). Step S4 is an example of a process executed by the obtainment unit. Next, the ECU 30 calculates the determination value by the above-described method based on the turbocharging pressure and the intake air amount obtained in steps S2 and S4 (step S5).

Next, the ECU 30 determines whether or not the determination value is less than a threshold value (step S6). As described above, the threshold valueT1 is used when the condition (a) is satisfied in the second monitoring condition. The threshold valueT2 is used when the condition (b) is satisfied in the second monitoring condition. The threshold valueT1 is a lower limit value of the difference in supercharging pressure with respect to the difference in the intake air amount, when the waste gate valve 9 is stuck closed after the idling state is shifted to the naturally aspirated state. The threshold valueT2 is a lower limit value of the difference in the supercharging pressure with respect to the difference in the intake air amount, when the waste gate valve 9 is stuck closed after the idling state is shifted to the supercharging state. The threshold valueT2 is not limited to a fixed value, and may be variably set according to the intake air amount.

In the case of Yes in step S6, the ECU 30 determines that the waste gate valve 9 is in the normal state (step S7). In the case of No in step S6, the ECU 30 determines that the waste gate valve 9 is in an abnormal state of being stuck closed (step S8). Steps S7 and S8 are examples of processes executed by the determination unit. When the abnormality determination is made, the ECU 30 may notify the driver that an abnormality has occurred in the waste gate valve 9, for example, by turning on a malfunction indicator light (MM).

In the above-described embodiment, the abnormality determination is executed based on the supercharging pressure and the intake air amount in each of the idling state and the supercharging state. For example, when a value obtained by dividing the supercharging pressure by the intake air amount in the supercharging state is less than a predetermined threshold, the waste gate valve 9 may be determined to be normal. When the value is equal to or greater than the threshold, the waste gate valve 9 is determined to be abnormal.

In the above-described embodiment, the full load state has been described as an example of the supercharging state in which the condition (b) of the second monitoring condition is satisfied, but the present disclosure is not limited thereto. For example, the supercharging state may be a case where the accelerator opening degree is equal to or greater than a predetermined opening degree.

The vehicle 100 is an engine vehicle in which only the engine 1 is mounted as a drive source, but is not limited thereto, and may be a hybrid vehicle in which a motor in addition to the engine is mounted as drive sources.

Although some embodiments of the present disclosure have been described in detail, the present disclosure is not limited to the specific embodiments but may be varied or changed within the scope of the present disclosure as claimed.

What is claimed is:

1. A vehicle comprising:
   an engine;
   a turbocharger that supercharges intake air to the engine;
   an exhaust passage connected to the engine, a turbine of the turbocharger being disposed in the exhaust passage;
   a bypass passage that bypasses the turbine and is connected to the exhaust passage;
   a waste gate valve that opens and closes the bypass passage; and
   an abnormality determination device configured to include a determination unit configured to determine an abnormality of the waste gate valve when an operation state of the engine is a supercharging state, wherein
   the abnormality determination device includes an obtainment unit configured to obtain a supercharging pressure and an intake air amount of the engine, and
   the determination unit is configured to determine the abnormality of the waste gate valve on a basis of the supercharging pressure and the intake air amount in the supercharging state and the supercharging pressure and the intake air amount in an idling state of the operation state.

2. The vehicle according to claim 1, wherein the determination unit is configured to determine that the waste gate valve is normal when a determination value obtained by dividing a difference in the supercharging pressure between the idling state and the supercharging state by a difference in the intake air amount between the idling state and the supercharging state is less than a threshold, and is configured to determine that the waste gate valve is abnormal when the determination value is equal to or greater than the threshold.

3. The vehicle according to claim 1, wherein the determination unit is configured to determine the abnormality of the waste gate valve on a basis of the supercharging pressure and the intake air amount in the idling state and the supercharging pressure and the intake air amount in a naturally aspirated state in which the operation state is other than the idling state.

4. The vehicle according to claim 1, wherein the supercharging state is a full load state in which an accelerator opening degree is maximum.

5. A vehicle comprising:
   an engine;
   a turbocharger that supercharges intake air to the engine;
   an exhaust passage connected to the engine, a turbine of the turbocharger being disposed in the exhaust passage;
   a bypass passage that bypasses the turbine and is connected to the exhaust passage;
   a waste gate valve that opens and closes the bypass passage; and
   processing circuitry configured to
      determine an abnormality of the waste gate valve when an operation state of the engine is a supercharging state,
      obtain a supercharging pressure and an intake air amount of the engine, and
      determine the abnormality of the waste gate valve on a basis of the supercharging pressure and the intake air amount in the supercharging state and the supercharging pressure and the intake air amount in an idling state of the operation state.

6. The vehicle according to claim 5, wherein the processing circuitry is configured to determine that the waste gate valve is normal when a determination value obtained by dividing a difference in the supercharging pressure between the idling state and the supercharging state by a difference in the intake air amount between the idling state and the supercharging state is less than a threshold, and is configured to determine that the waste gate valve is abnormal when the determination value is equal to or greater than the threshold.

7. The vehicle according to claim 5, wherein the processing circuitry is configured to determine the abnormality of the waste gate valve on a basis of the supercharging pressure and the intake air amount in the idling state and the supercharging pressure and the intake air amount in a naturally aspirated state in which the operation state is other than the idling state.

8. The vehicle according to claim 5, wherein the supercharging state is a full load state in which an accelerator opening degree is maximum.

* * * * *